United States Patent
Guo

(10) Patent No.: US 11,630,213 B1
(45) Date of Patent: Apr. 18, 2023

(54) PIXEL CIRCUIT OF TIME-OF-FLIGHT SENSOR AND METHOD FOR OPERATING THE SAME, CIRCUIT CONFIGURATION OF PIXEL CIRCUIT OF TIME-OF-FLIGHT SENSOR

(71) Applicant: SMARTSENS TECHNOLOGY (HK) CO., LIMITED, Kowloon OT (HK)

(72) Inventor: Tonghui Guo, Shanghai (CN)

(73) Assignee: SMARTSENS TECHNOLOGY (HK) CO., LIMITED, Kowloon OT (HK)

( * ) Notice: Subject to any disclaimer, the term of this patent is extended or adjusted under 35 U.S.C. 154(b) by 0 days.

(21) Appl. No.: 17/564,973

(22) Filed: Dec. 29, 2021

(30) Foreign Application Priority Data

Sep. 16, 2021 (CN) .......................... 202111085828.8

(51) Int. Cl.
*G01S 17/894* (2020.01)
*G01S 7/4863* (2020.01)
*G01S 7/4914* (2020.01)

(52) U.S. Cl.
CPC .......... *G01S 17/894* (2020.01); *G01S 7/4863* (2013.01); *G01S 7/4914* (2013.01)

(58) Field of Classification Search
CPC ..... G01S 17/894; G01S 7/4863; G01S 7/4914
See application file for complete search history.

(56) References Cited

U.S. PATENT DOCUMENTS

2022/0247952 A1\* 8/2022 Brady ................... G01S 17/894

\* cited by examiner

*Primary Examiner* — Tony Ko
(74) *Attorney, Agent, or Firm* — Alston & Bird LLP

(57) ABSTRACT

A pixel circuit of a time-of-flight sensor is disclosed, in the pixel cell in the Mth row and the Nth column, the photoelectric conversion element receives a modulated light wave to generate charges; the first charge storage and transfer circuit, the second charge storage and transfer circuit, the third charge storage and transfer circuit and the fourth charge storage and transfer circuit selectively modulates charges corresponding to four phases of the modulated light wave to generate four integrated charge signals according to four charge modulation signals, and outputs four integrated charge signals according to four control signals; the charge readout circuit outputs a third photoelectric signal and a second photoelectric signal according to the third integrated charge signal and the second integrated charge signal. Thus, the left and right pixel cells which are adjacent to each other share the charge readout circuit, the size of the pixel circuit is reduced.

19 Claims, 7 Drawing Sheets

PIXEL CIRCUIT OF TIME-OF-FLIGHT SENSOR AND METHOD FOR OPERATING THE SAME, CIRCUIT CONFIGURATION OF PIXEL CIRCUIT OF TIME-OF-FLIGHT SENSOR

CROSS-REFERENCE TO RELATED APPLICATION

The present application claims priority to Chinese patent application No. 202111085828.8, filed on Sep. 16, 2021 and entitled "pixel circuit of time-of-flight sensor, circuit configuration of pixel circuit of time-of-flight sensor, and time-of-flight sensor", the contents of which are incorporated herein by reference in its entirety.

TECHNICAL FIELD

The present application relates to the technical field of sensors, and more particularly to a pixel circuit of a time-of-flight sensor and a method for operating the same, and a circuit configuration of pixel circuit of time-of-flight sensor.

BACKGROUND

Time-of-flight sensor is an important part of a ranging device, and can capture three-dimensional (3D) distance information of a target object to obtain 3D images, and is widely used in the fields of behavior analysis, monitoring, automatic driving of automobiles, artificial intelligence, machine vision perception, and image 3D enhancement. With the continuous progress of semiconductor manufacturing technology, flight time sensors are developed toward low power consumption, high integration, and smaller size; in a plurality of application fields, sensor chips used to collect 3D data tend to be miniaturized increasingly.

The time-of-flight sensor uses a time-of-flight method to measure a travel time of light pulse during which the light pulse is transmitted from a transmission terminal of a light source to the target object and then is reflected to a receiving terminal of a sensor, thereby determining a distance information of the target object. The time-of-flight sensor can obtain time-of-flight of light by using a direct method, the time-of-flight sensor can also use an indirect method to obtain the time-of-flight of light, and the indirect method refers to recording phase difference of a time period of light pulse from light transmission to light reception to calculate the time-of-flight of light.

The time-of-flight sensor generally includes a light source transmission module and a light source sensing module. The light source transmission module is configured to emit a sine wave or a pulse square wave in a specific frequency; and the light source sensing module is configured to record the phase difference the time period from light transmission to light reception, thereby calculating the distance information of the object to be measured.

The light source sensing module generally includes a photosensitive pixel module and a photoelectric signal processing system module. The photosensitive pixel module obtains time data by using the indirect method, and needs to collect four phase signals (i.e., 0 degree, 90 degrees, 180 degrees and 270 degrees) of the sinusoidal continuous light wave, and thereby estimate time information.

In the prior art, a plurality of transistor devices are usually included in one pixel cell so as to collect photoelectric phase signals, and the operational steps required to be completed include: modulating photoelectric charge signals, storing the photoelectric charge signals, converting the photoelectric charge signals into photoelectric signals, and outputting the photoelectric signals; the collection of four photoelectric phase signals requires four groups of transistor devices used for modulating and storing the photoelectric charge signals, and converting the photoelectric charge signals into the photoelectric signals, too excessive transistor devices will occupy too many pixel areas, thereby bringing difficulties to the improvement of photosensitivity of pixels and the miniaturization of size of sensor.

SUMMARY

An objective of the present application is to provide a pixel circuit of a time-of-flight sensor, a circuit configuration of the pixel circuit of the time-of-flight sensor, and the time-of-flight sensor, which aims at solving deficiencies of bad photosensitivity of pixels and bigger size of sensor existing in the conventional time-of-flight sensor.

One embodiment of the present application provides a pixel circuit of a time-of-flight sensor, including: pixel cells having A rows and B columns, where a pixel cell in an Mth row and an Nth column includes: a photoelectric conversion element configured to receive a modulated light wave to generate a charge; where the modulated light wave is transmitted by a transmission circuit of a light source and is reflected by a target object to the photoelectric conversion element; a first charge storage and transfer circuit connected with the photoelectric conversion element and configured to selectively modulate a charge corresponding to a first phase of the modulated light wave to generate a first integrated charge signal according to a first charge modulation signal, and output the first integrated charge signal according to a first control signal; a second charge storage and transfer circuit connected with the photoelectric conversion element and configured to selectively modulate a charge corresponding to a second phase of the modulated light wave to generate a second integrated charge signal according to a second charge modulation signal, and output the second integrated charge signal according to a second control signal; a third charge storage and transfer circuit connected with the photoelectric conversion element and configured to selectively modulate a charge corresponding to a third phase of the modulated light wave to generate a third integrated charge signal according to a third charge modulation signal, and output the third integrated charge signal according to a third control signal; a fourth charge storage and transfer circuit connected with the photoelectric conversion element and configured to selectively modulate a charge corresponding to a fourth phase of the modulated light wave to generate a fourth integrated charge signal according to a fourth charge modulation signal, and output the fourth integrated charge signal according to a fourth control signal; a charge readout circuit commonly connected with an output of the third charge storage and transfer circuit and an output of the second charge storage and transfer circuit, and configured to output a third photoelectric signal to obtain a third calculation signal according to the third integrated charge signal, and output a second photoelectric signal to obtain a second calculation signal according to the second integrated charge signal;

where the charge readout circuit of the pixel cell in the Mth row and the Nth column is further commonly connected with an output of a first charge storage and transfer circuit of a pixel cell in an Mth row and a (N+1)th column and an output of a fourth charge storage and transfer circuit of a pixel cell in an Mth row and a (N+1)th column, and the charge readout circuit of the pixel cell in the Mth row and the Nth column is configured to output a first photoelectric signal of the pixel cell in the Mth row and the (N+1)th column to obtain a first calculation signal of the pixel cell in the Mth row and the (N+1)th column according to a first integrated charge signal output by the pixel cell in the Mth row and the (N+1)th column, and the charge readout circuit of the pixel cell in the Mth row and the Nth column is configured to output a fourth photoelectric signal of the pixel cell in the Mth row and the (N+1)th column to obtain a fourth calculation signal of the pixel cell in the Mth row and the (N+1)th column according to a fourth integrated charge signal output by the pixel cell in the Mth row and the (N+1)th column;

wherein a time of flight of light is obtained based on the first calculation signal, the second calculation signal, the third calculation signal and the fourth calculation signal corresponding to each of the pixel cells; both A and B are natural numbers, M is a natural number less than or equal to A, and N is a natural number less than B.

A circuit configuration of the pixel circuit of the time-of-flight sensor is further provided in one embodiment of the present application, where the photoelectric conversion element is located at an intermediate portion of the pixel cell in the Mth row and the Nth column, and the charge readout circuit is located at a right side of the photoelectric conversion element, an output of the first charge storage and transfer circuit of the pixel cell in the Mth row and the (N+1)th column, an output of a fourth charge storage and transfer circuit of the pixel cell in the Mth row and the (N+1)th column, an output of the third charge storage and transfer circuit of the pixel cell in the Mth row and the Nth column and an output of a second charge storage and transfer circuit of the pixel cell in the Mth row and the (N+1)th column are commonly connected to an input of the charge readout circuit of the pixel cell in the Mth row and the Nth column.

A time-of-flight sensor is further provided in one embodiment of the present application, where the time-of-flight sensor includes a pixel circuit, the pixel circuit includes pixel cells having A rows and B columns, where a pixel cell in an Mth row and an Nth column includes: a photoelectric conversion element configured to receive a modulated light wave to generate a charge; wherein the modulated light wave is transmitted by a transmission circuit of a light source and is reflected by a target object to the photoelectric conversion element; a first charge storage and transfer circuit connected with the photoelectric conversion element and configured to selectively modulate a charge corresponding to a first phase of the modulated light wave to generate a first integrated charge signal according to a first charge modulation signal, and output the first integrated charge signal according to a first control signal; a second charge storage and transfer circuit connected with the photoelectric conversion element and configured to selectively modulate a charge corresponding to a second phase of the modulated light wave to generate a second integrated charge signal according to a second charge modulation signal, and output the second integrated charge signal according to a second control signal; a third charge storage and transfer circuit connected with the photoelectric conversion element and configured to selectively modulate a charge corresponding to a third phase of the modulated light wave to generate a third integrated charge signal according to a third charge modulation signal, and output the third integrated charge signal according to a third control signal; a fourth charge storage and transfer circuit connected with the photoelectric conversion element and configured to selectively modulate a charge corresponding to a fourth phase of the modulated light wave to generate a fourth integrated charge signal according to a fourth charge modulation signal, and output the fourth integrated charge signal according to a fourth control signal; a charge readout circuit commonly connected with an output of the third charge storage and transfer circuit and an output of the second charge storage and transfer circuit, and configured to output a third photoelectric signal to obtain a third calculation signal according to the third integrated charge signal, and output a second photoelectric signal to obtain a second calculation signal according to the second integrated charge signal; where the charge readout circuit of the pixel cell in the Mth row and the Nth column is further commonly connected with an output of a first charge storage and transfer circuit of a pixel cell in an Mth row and a (N+1)th column and an output of a fourth charge storage and transfer circuit of a pixel cell in an Mth row and a (N+1)th column, and the charge readout circuit of the pixel cell in the Mth row and the Nth column is configured to output a first photoelectric signal of the pixel cell in the Mth row and the (N+1)th column to obtain a first calculation signal of the pixel cell in the Mth row and the (N+1)th column according to a first integrated charge signal output by the pixel cell in the Mth row and the (N+1)th column, and the charge readout circuit of the pixel cell in the Mth row and the Nth column is configured to output a fourth photoelectric signal of the pixel cell in the Mth row and the (N+1)th column to obtain a fourth calculation signal of the pixel cell in the Mth row and the (N+1)th column according to a fourth integrated charge signal output by the pixel cell in the Mth row and the (N+1)th column; where a time of flight of light is obtained based on the first calculation signal, the second calculation signal, the third calculation signal and the fourth calculation signal corresponding to each of the pixel cells; both A and B are natural numbers, M is a natural number less than or equal to A, and N is a natural number less than B.

A method for controlling the pixel circuit of the time-of-flight sensor is further provided in one embodiment of the present application, this method includes following steps:

obtaining the first integrated charge signal, the second integrated charge signal, the third integrated charge signal and the fourth integrated charge signal in a global exposure manner; and reading, row by row, first photoelectric signals, second photoelectric signals, third photoelectric signals, and fourth photoelectric signals corresponding to the first integrated charge signal, the second integrated charge signal, the third integrated charge signal, and the fourth integrated charge signal in a rolling readout manner.

Compared with the related art, the advantageous effects in the embodiments of the present application are as follows: due to the fact that four charge storage and transfer circuits are respectively used to modulate the charges corresponding to the four phases of the modulated light wave to generate four integrated charge signals, the left and right pixel cells which are adjacent to each other share the same charge readout circuit, so that the size of the pixel circuit can be reduced, a photosensitive area of the photoelectric conversion element in each pixel cell is further increased, and photosensitivity of pixels is improved accordingly.

BRIEF DESCRIPTION OF THE DRAWINGS

In order to explain the embodiments of the present application be clearer, a brief introduction regarding the accompanying drawings that need to be used in the embodiments is given below; it is apparent that the accompanying drawings described below are only some embodiments of the present application, a person of ordinary skill in the art can also obtain other drawings according to the current drawings without paying creative labor.

DESCRIPTION OF THE EMBODIMENTS

In order to make the purpose, the technical solution and the advantages of the present application be clearer and more understandable, the present application will be further described in detail below with reference to accompanying figures and embodiments. It should be understood that the embodiments described in detail herein are merely intended to illustrate but not to limit the present application.

It needs to be noted that, when one component is described to be "fixed to" or "arranged on" another component, this component may be directly or indirectly arranged on another component. When it is described that one component "is connected with" another component, this component may be directly or indirectly connected to the another component.

It needs to be understood that, directions or location relationships indicated by terms such as "length", "width", "up", "down", "front", "rear", "left", "right", "vertical", "horizontal", "top", "bottom", "inside", "outside", and so on are the directions or location relationships shown in the accompanying figures, which are only intended to describe the present application conveniently and simplify the description, but not to indicate or imply that an indicated device or component must have specific locations or be constructed and manipulated according to specific locations; therefore, these terms shouldn't be considered as any limitation to the present application.

In addition, terms "the first" and "the second" are only used in describe purposes, and should not be considered as indicating or implying any relative importance, or implicitly indicating the number of indicated technical features. As such, technical feature(s) restricted by "the first" or "the second" can explicitly or implicitly comprise one or more such technical feature(s). In the description of the present application, "a plurality of" has the meaning of at least two, unless there is additional explicit and specific limitation.

Figure 1:
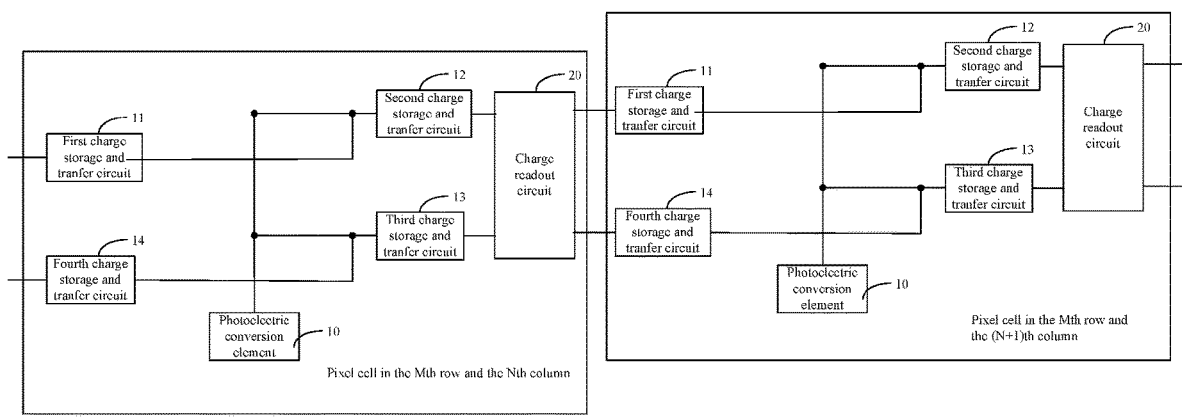
FIG. 1 illustrates a schematic diagram of one circuit configuration of a pixel cell of a time-of-flight sensor according to one embodiment of the present application.

FIG. 1 illustrates a schematic diagram of circuit configuration of a pixel circuit of a time-of-flight sensor according to one preferable embodiment of the present application, for the convenience of illustration, the contents relevant to this embodiment is only illustrated, the contents are described in detail below:

The pixel circuit of the time-of-flight sensor comprises pixel cells having A rows and B columns, where a pixel cell in an Mth row and an Nth column includes: a photoelectric conversion element 10, a first charge storage and transfer circuit 11, a second charge storage and transfer circuit 12, a third charge storage and transfer circuit 13, a fourth charge storage and transfer circuit 14, and a charge readout circuit 20, where both A and B are natural numbers, M is a natural number less than or equal to A, and N is a natural number less than B.

The photoelectric conversion element 10 is configured to receive a modulated light wave to generate a charge; where the modulated light wave is transmitted by a transmission circuit of a light source and is reflected by a target object to the photoelectric conversion element 10;

The first charge storage and transfer circuit 11 connected with the photoelectric conversion element 10 and is configured to selectively modulate a charge corresponding to a first phase of the modulated light wave to generate a first integrated charge signal according to a first charge modulation signal, and output the first integrated charge signal according to a first control signal.

The second charge storage and transfer circuit 12 is connected with the photoelectric conversion element 10 and is configured to selectively modulate a charge corresponding to a second phase of the modulated light wave to generate a second integrated charge signal according to a second charge modulation signal, and output the second integrated charge signal according to a second control signal.

The third charge storage and transfer circuit 13 is connected with the photoelectric conversion element 10 and is configured to selectively modulate a charge corresponding to a third phase of the modulated light wave to generate a third integrated charge signal according to a third charge modulation signal, and output the third integrated charge signal according to a third control signal.

The fourth charge storage and transfer circuit 14 is connected with the photoelectric conversion element 10 and is configured to selectively modulate a charge corresponding to a fourth phase of the modulated light wave to generate a fourth integrated charge signal according to a fourth charge modulation signal, and output the fourth integrated charge signal according to a fourth control signal.

The charge readout circuit 20 is commonly connected with an output of the third charge storage and transfer circuit 13 and an output of the second charge storage and transfer circuit 12, and is configured to output a third photoelectric signal to obtain a third calculation signal according to the third integrated charge signal, and output a second photoelectric signal to obtain a second calculation signal according to the second integrated charge signal.

The charge readout circuit 20 of the pixel cell in the Mth row and the Nth column is further commonly connected with an output of a first charge storage and transfer circuit 11 and an output of a fourth charge storage and transfer circuit 14 of a pixel cell in an Mth row and a (N+1)th column, and is configured to output a first photoelectric signal of the pixel cell in the Mth row and the (N+1)th column to obtain a first calculation signal of the pixel cell in the Mth row and the (N+1)th column according to a first integrated charge signal output by the pixel cell in the Mth row and the (N+1)th column, and to output a fourth photoelectric signal of the pixel cell in the Mth row and the (N+1)th column to obtain a fourth calculation signal of the pixel cell in the Mth row and the (N+1)th column according to a fourth integrated charge signal output by the pixel cell in the Mth row and the (N+1)th column.

wherein a time of flight is obtained based on the first calculation signal, a second calculation signal, a third calculation signal and the fourth calculation signal corresponding to each of the pixel cells.

It needs to be emphasized that, the first calculation signal, the second calculation signal, the third calculation signal and the fourth calculation signal are obtained based on one frame pixel operation in one implementation mode.

In one particular embodiment, the pixel cell in the Mth row and the Nth column includes a first switch circuit and a second switch circuit, an input of the first charge storage and transfer circuit 11 and an input of the second charge storage and transfer circuit 12 are commonly connected with one end of the photoelectric conversion element through the first switch circuit, an input of the third charge storage and transfer circuit 13 and an input of the fourth charge storage and transfer circuit 14 are commonly connected with the other end of the photoelectric conversion element 10 through the second switch circuit. Where the first switch circuit is configured to transmit a charge according to a first switch control signal, the second switch circuit is configured to transmit a charge according to a second switch control signal.

Crosstalk between the charges that correspond to different phases are avoided through the first switch circuit and the second switch circuit.

The first phase, the second phase, the third phase, and the fourth phase are one among a group consisting of 0 degrees, 90 degrees, 180 degrees, and 270 degrees; a period of modulated light source is composed of four period intervals which correspond to the first phase, the second phase, the third phase and the fourth phase in a one-to-one correspondence manner, so that the charges respectively corresponding to the first phase, the second phase, the third phase and the fourth phase are obtained.

The period of modulated light source is composed of four period intervals which correspond to the first phase, the second phase, the third phase and the fourth phase in a one-to-one correspondence manner, so that the charges respectively corresponding to the first phase, the second phase, the third phase and the fourth phase are obtained. Where the ranges of the four period intervals can be identical, the first phase, the second phase, the third phase and the fourth phase correspond to the mediants of the fourth period intervals, respectively. For example, the first phase, the second phase, the third phase and the fourth phase are 0 degree, 90 degrees, 180 degrees and 270 degrees, respectively, the four period intervals are (−45 degrees, 45 degrees), (45 degrees, 135 degrees), (135 degrees, 225 degrees), (225 degrees, 315 degrees), respectively.

It should be noted that the first phase, the second phase, the third phase and the fourth phase may be arranged in sequence. A phase difference between every two adjacent phases in the first phase, the second phase, the third phase, and the fourth phase is 90 degrees.

According to the phase difference of 90 degrees between every two adjacent phases in the first phase, the second phase, the third phase and the fourth phase, so that four phases of photoelectric signals with a phase difference of 90 degrees can be obtained, calculation of time information is facilitated, and a calculation efficiency of the time information is further improved.

Figure 2:
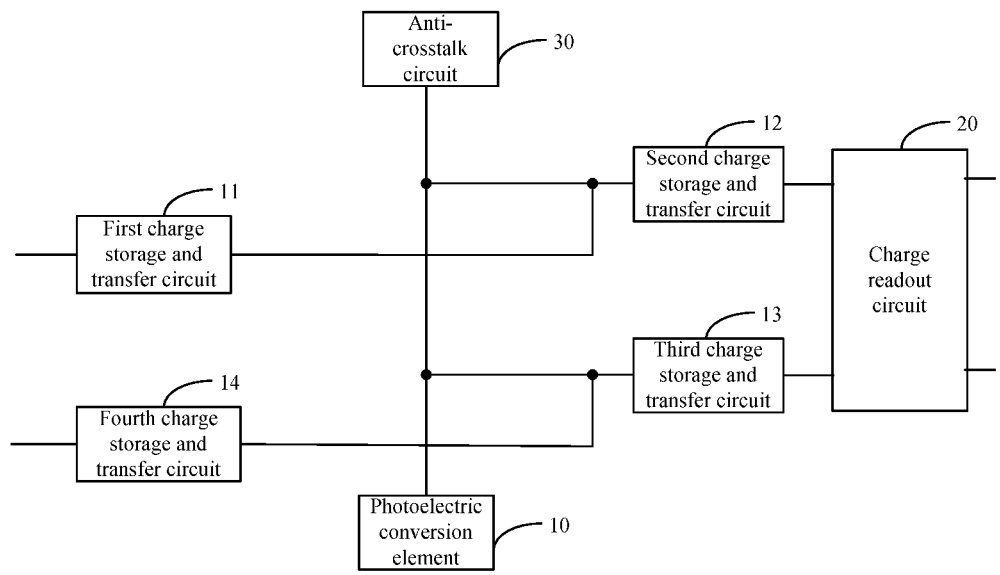
FIG. 2 illustrates a schematic diagram of another circuit configuration of a pixel cell of a time-of-flight sensor according to one embodiment of the present application.

As shown in FIG. 2, the pixel cell in the Mth row and the Nth column further includes an anti-crosstalk circuit 30 connected with the photoelectric conversion element 10, the first charge storage and transfer circuit 11, the second charge storage and transfer circuit 12, the third charge storage and transfer circuit 13, and the fourth charge storage and transfer circuit 14. The anti-crosstalk circuit 30 is configured to remove charges in the photoelectric conversion element 10 according to an anti-crosstalk control signal.

According to the anti-charge crosstalk circuit 30, the charges in the photoelectric conversion element 10 are removed every time when the time information is measured, so that the accuracy of acquisition of time information is improved.

Figure 3:
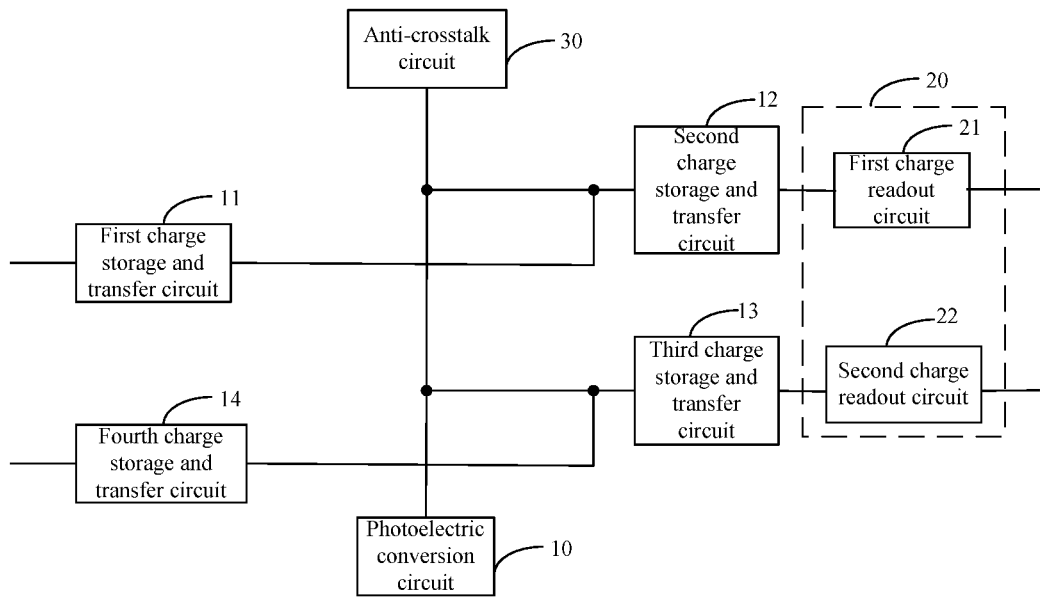
FIG. 3 illustrates a schematic diagram of a circuit configuration of a charge readout circuit in the pixel cell of the time-of-flight sensor according to one embodiment of the present application.

As shown in FIG. 3, the charge readout circuit 20 of the pixel cell in the Mth row and the Nth column includes a first charge readout circuit 21 and a second charge readout circuit 22.

Where the first charge readout circuit 21 is connected with an output of the second charge storage and transfer circuit 12 of the pixel cell in the Mth row and the Nth column and an output of the first charge storage and transfer circuit 11 of the pixel cell in the Mth row and the (N+1)th column, and is configured to output a second photoelectric signal of the pixel cell in the Mth row and the Nth column to obtain a second calculation signal of the pixel cell in the Mth row and the Nth column according to a second integrated charge signal of the pixel cell in the Mth row and the Nth column, and to output a first photoelectric signal of the pixel cell in the Mth row and the (N+1)th column to obtain a first calculation signal of the pixel cell in the Mth row and the (N+1)th column according to the first integrated charge signal of the pixel cell in the Mth row and the (N+1)th column.

The second charge readout circuit 22 is connected to an output of a third charge storage and transfer circuit 13 of the pixel cell in the Mth row and the Nth column and an output of the fourth charge storage and transfer circuit 14 of the pixel cell in the Mth row and the (N+1)th column, and is configured to output a third calculation signal of the pixel cell in the Mth row and the Nth column to obtain a third calculation signal of the pixel cell in the Mth row and the Nth column according to a third integrated charge signal of the pixel cell in the Mth row and the Nth column, and to output a fourth photoelectric signal of the pixel cell in the Mth row and the (N+1)th column to obtain a fourth calculation signal of the pixel cell in the Mth row and the (N+1)th column according to a fourth integrated charge signal of the pixel cell in the Mth row and the (N+1)th column.

Due to the fact that the charge readout circuit 20 includes two charge readout circuits, the speed of reading out charges is improved, and the speed of acquisition of time information is improved accordingly.

In one particular embodiment, the anti-crosstalk control signal, the first charge modulation signal, the second charge modulation signal, the third charge modulation signal, the fourth charge modulation signal, the first control signal, the second control signal, the third control signal, and the fourth control signal may be output by a control logic.

A method for controlling the pixel circuit of the time-of-flight sensor is further provided in one embodiment of the present application, characterized in that, the control method includes a step 101 and a step 102.

In the step 101, the first integrated charge signal, the second integrated charge signal, the third integrated charge signal, and the fourth integrated charge signal are obtained in a global exposure manner.

In the step 102, first photoelectric signals, second photoelectric signals, third photoelectric signals, and fourth photoelectric signals corresponding to the first integrated charge signal, the second integrated charge signal, the third integrated charge signal, and the fourth integrated charge signal are read out row by row in a rolling readout manner.

Figure 4:
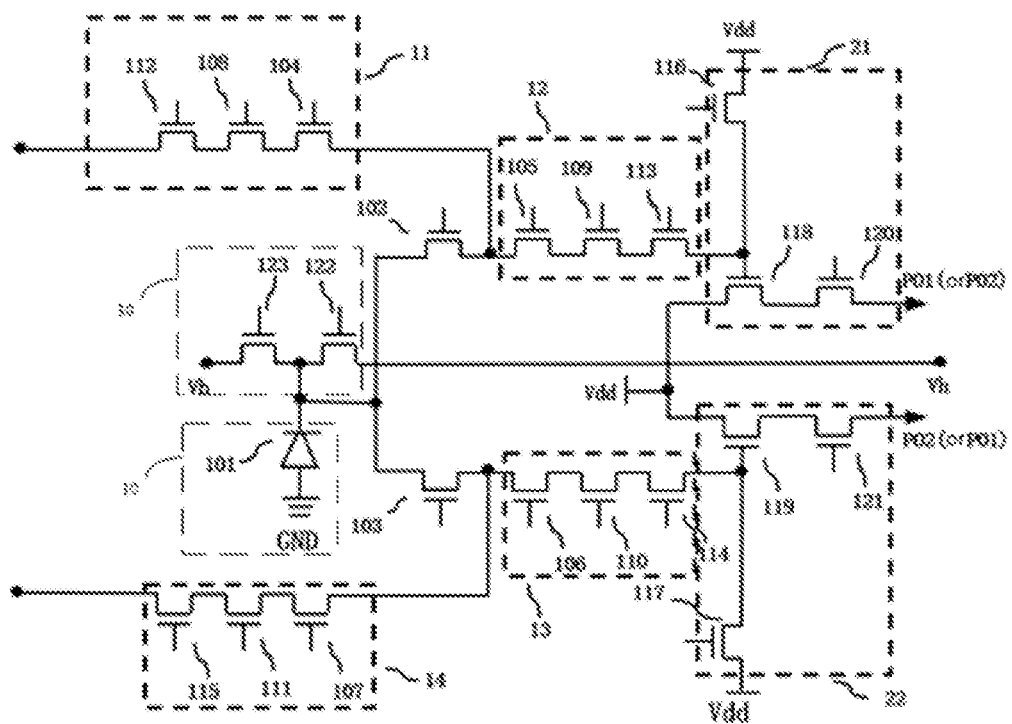
FIG. 4 illustrates a schematic diagram of a circuit principle of a pixel cell in the pixel circuit of the time-of-flight sensor according to one embodiment of the present application.

FIG. 4 illustrates a schematic circuit configuration of the pixel circuit of the time-of-flight sensor according to one embodiment of the present application, for the convenience of illustration, the contents relevant to this embodiment of the present application is illustrated merely, and these contents are described in detail below:

The first charge storage and transfer circuit 11 includes a first charge transfer transistor 104, a first charge storage device 108, and a first charge selection transistor 112.

A source electrode of the first charge transfer transistor 104 is connected to a charge input of the first charge storage and transfer circuit 11, a drain electrode of the first charge transfer transistor 104 is connected with a source electrode of the first charge storage device 108, a drain electrode of the first charge storage device 108 is connected to a source electrode of the first charge selection transistor 112, and a drain electrode of the first charge selection transistor 112 is connected with a first integrated charge signal output of the first charge storage and a transfer circuit 11.

A gate electrode of the first charge transfer transistor 104 is connected to a control line of the first charge modulation signal, and a gate electrode of the first charge selection transistor 112 is connected to a control line of the first control signal;

A first voltage is received at a gate electrode of the first charge storage device 108; the first voltage may be a voltage with any specified value according to the actual requirement, the first voltage may also indicate that a second end of the first charge storage device 108 is grounded.

The second charge storage and transfer circuit 12 includes a second charge transfer transistor 105, a second charge storage device 109, and a second charge selection transistor 113.

where a source electrode of the second charge transfer transistor 105 is connected to a charge input of the second charge storage and transfer circuit 12, a drain electrode of the second charge transfer transistor 105 is connected with a source electrode of the second charge storage device 109, a drain electrode of the second charge storage device 109 is connected with a source electrode of the second charge selection transistor 113, and a drain electrode of the second charge selection transistor 113 is connected with a second integrated charge signal output of the second charge storage and transfer circuit 12.

A gate electrode of the second charge transfer transistor 105 is connected to a control line of the second charge modulation signal, and a gate electrode of the second charge selection transistor 113 is connected to a control line of the second control signal.

A second voltage is received at a gate electrode of the second charge storage device 109; where the second voltage may be a voltage with any specified value according to the actual requirement, the second voltage may also indicate that a second end of the second charge storage device 109 is grounded.

The third charge storage and transfer circuit 13 includes a third charge transfer transistor 106, a third charge storage device 110, and a third charge selection transistor 114.

Where a source electrode of the third charge transfer transistor 106 is connected to a charge input of the third charge storage and transfer circuit 13, a drain electrode of the third charge transfer transistor 106 is connected to a source electrode of the third charge storage device 110, a drain electrode of the third charge storage device 110 is connected to a source electrode of the third charge selection transistor 114, and a drain electrode of the third charge selection transistor 114 is connected to a third integrated charge signal output of the third charge storage and transfer circuit 13.

A gate electrode of the third charge transfer transistor 106 is connected to a control line of the third charge modulation signal, and a gate electrode of the third charge selection transistor 114 is connected to a control line of the third control signal.

A third voltage is received at a gate electrode of the third charge storage device 110; where the third voltage may be a voltage with any specified value according to the actual requirement, the third voltage may also indicate that a second end of the third charge storage device 110 is grounded.

The fourth charge storage and transfer circuit 14 includes a fourth charge transfer transistor 107, a fourth charge storage device 111, and a fourth charge selection transistor 115.

Where a source electrode of the fourth charge transfer transistor 107 is connected to a charge input of the fourth charge storage and transfer circuit 14, a drain electrode of the fourth charge transfer transistor 107 is connected with a source electrode of the fourth charge storage device 111, a drain electrode of the fourth charge storage device 111 is connected with a source electrode of the fourth charge selection transistor 115, and a drain electrode of the fourth charge selection transistor 115 is connected to a fourth integrated charge signal output of the fourth charge storage and transfer circuit 14.

A gate electrode of the fourth charge transfer transistor 107 is connected to a control line of the fourth charge modulation signal, and a gate electrode of the fourth charge selection transistor 115 is connected to a control line of the fourth control signal.

A fourth voltage is received at a gate electrode of the fourth charge storage device 111. Where the fourth voltage may be a voltage with any specified value according to the actual requirement, the fourth voltage may also indicate that a second end of the fourth charge storage device 111 is grounded.

The first charge readout circuit 21 includes a first reset transistor 116, a first source follower transistor 118 and a first pixel selection transistor 120.

Where a drain electrode of the first reset transistor 116 is connected with a first power supply, a drain electrode of the first source follower transistor 118 is connected to a second power supply, the first power supply is identical to or different from the second power supply, a source electrode of the first reset transistor 116 and a gate electrode of the first source follower transistor 118 are commonly connected to an integrated charge signal input, a source electrode of the first source follower transistor 118 is connected with a drain electrode of the first pixel selection transistor 120, and a source electrode of the first pixel selection transistor 120 is connected to a photoelectric signal output PO1 (or PO2).

A gate electrode of the first reset transistor 116 is connected to a first reset control line to serve as a first reset control signal input and a second reset control signal input of the first charge readout circuit 21.

A floating diffusion active region serves as an integrated charge input.

The second charge readout circuit 20 includes a second reset transistor 117, a second source follower transistor 119, and a second pixel selection transistor 121.

Where a drain electrode of the second reset transistor 117 is connected to the first power supply, a drain electrode of the second source follower transistor 119 is connected to the second power supply, the first power supply is identical to or different from the second power supply, a source electrode of the second reset transistor 117 and a gate electrode of the second source follower transistor 119 are commonly connected to an integrated charge signal input, a source electrode of the second source follower transistor 119 is connected with a drain electrode of the second pixel selection transistor 121, and a source electrode of the second pixel selection transistor 121 is connected to a photoelectric signal output PO2 (or PO1).

A gate electrode of the second reset transistor 117 is connected to a second reset control line to serve as a third reset control signal input and a fourth reset control signal input of the second charge readout circuit 20.

A floating diffusion active region serves as an integrated charge input.

the anti-crosstalk circuit 30 includes a first charge releasing transistor 122 and a second charge releasing transistor 123;

a source electrode of the first charge releasing transistor 122 and a source electrode of the second charge releasing transistor 123 are commonly connected to an output of the photoelectric conversion element 10, a drain electrode of the first charge releasing transistor 122 and a drain electrode of the second charge releasing transistor 123 are commonly connected to a control power supply, and the anti-crosstalk control signal is received at a gate electrode of the first charge releasing transistor 122 and a gate electrode of the second charge releasing transistor 123. The voltage of the control power supply is lower than the voltage of the first power supply and is greater than 0V.

The photoelectric conversion element 101 includes but is not limited to a pinned photodiode, a polysilicon photogate photodiode, and a current assistance photodiode. The charge storage device includes but is not limited to a MOS transistor type capacitor, a polysilicon gate-insulator-polysilicon gate type capacitor, and a metal-insulator-metal capacitor.

The first switch circuit includes a first switching transistor 102, a source electrode of the first switching transistor 102 is connected to a charge input terminal of the first switch circuit, a drain electrode of the first switching transistor 102 is connected to a charge output of the first switch circuit, and a gate electrode of the first switching transistor 102 is connected to a control line of the first switch circuit.

The second switch circuit includes a second switch transistor 103, a source electrode of the second switch transistor 103 is connected to a charge input terminal of the second switch circuit, a drain electrode of the second switch transistor 103 is connected to a charge output of the second switch circuit, and a gate electrode of the second switch transistor 103 is connected to a control line of the second switch circuit.

Figure 5:
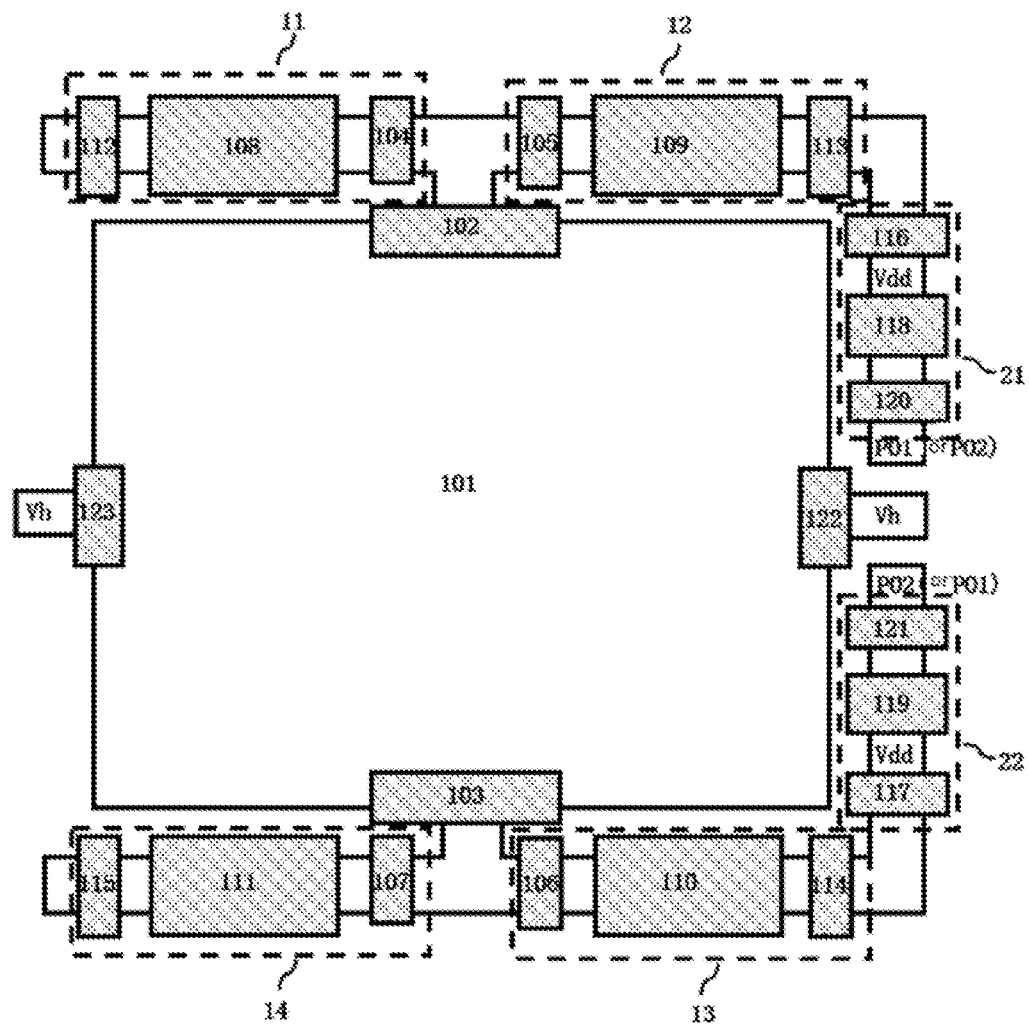
FIG. 5 illustrates a schematic diagram of a layout of the pixel circuit of the time-of-flight sensor according to one embodiment of the present application.
Figure 6:
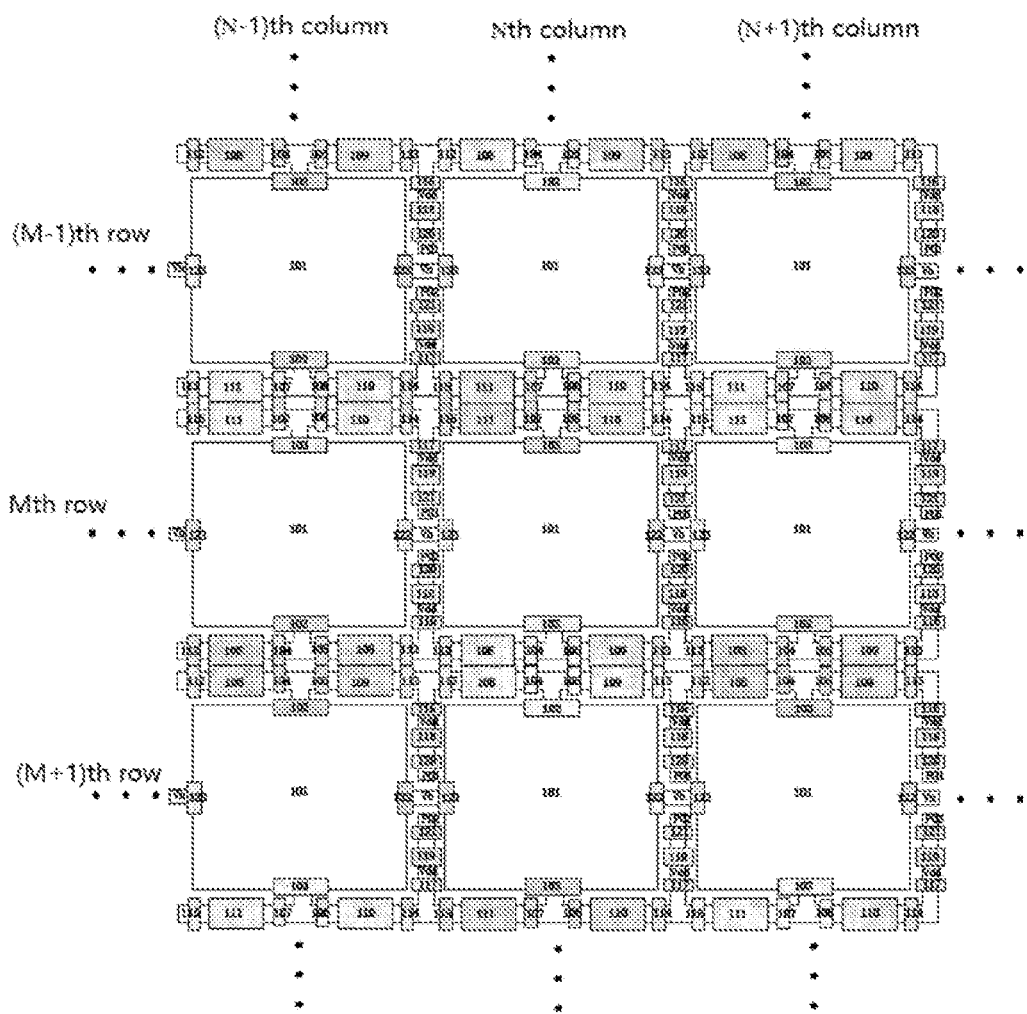
FIG. 6 illustrates a schematic diagram of another layout of the pixel circuit of the time-of-flight sensor according to one embodiment of the present application.
Figure 7:
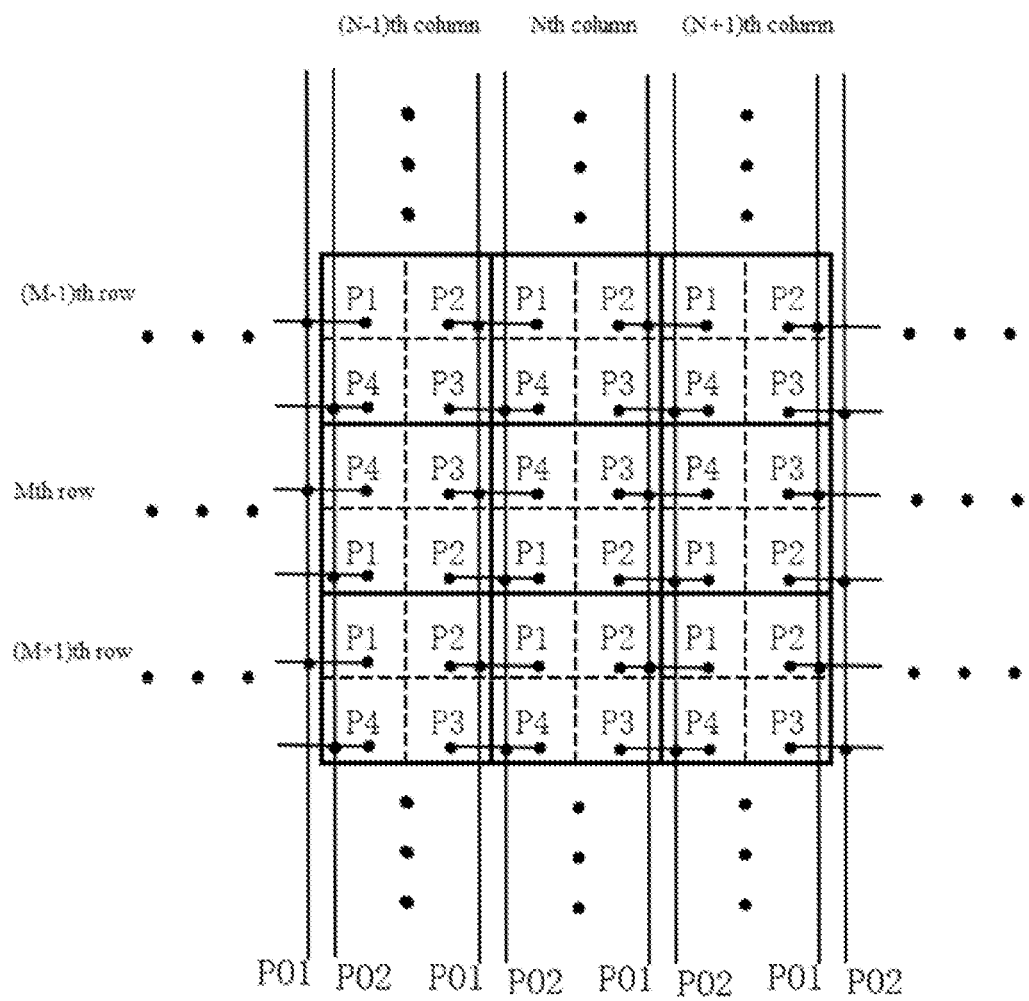
FIG. 7 illustrates a schematic diagram of reading photoelectric signals in the pixel circuit of the time-of-flight sensor according to one embodiment of the present application.
Figure 8:
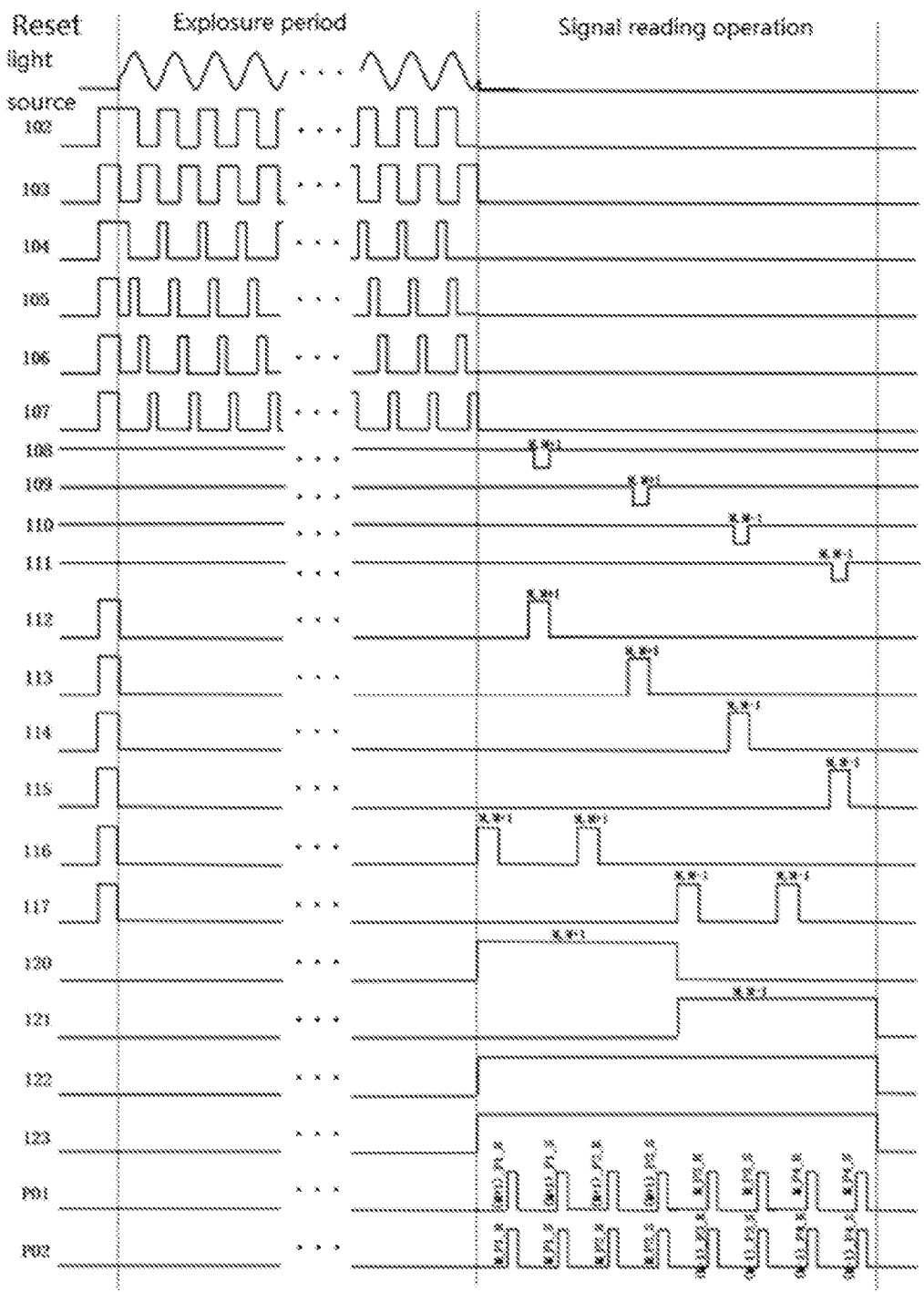
FIG. 8 illustrates a diagram of timing control of the pixel circuit of the time-of-flight sensor according to one embodiment of the present application.

FIG. 5 illustrates a schematic diagram of a layout of the pixel circuit of the time-of-flight sensor according to one embodiment of the present application, FIG. 6 illustrates a schematic diagram of a layout of the pixel circuit of the time-of-flight sensor according to another embodiment of the present application, FIG. 7 illustrates a schematic diagram of reading photoelectric signals from the pixel circuit of the time-of-flight sensor according to one embodiment of the present application, FIG. 8 illustrates a schematic diagram of timing control of the pixel circuit of the time-of-flight sensor according to one embodiment of the present application. For the convenience of illustration, the contents relevant to this embodiment of the present application are shown merely, the contents are described in detail below:

In the pixel layout of the pixel circuit of the time-of-flight sensor, the photoelectric conversion element 10 is located at an intermediate portion of the pixel cell in the Mth row and the Nth column, and the charge readout circuit 20 is located at a right side of the photoelectric conversion element 10, an output of the first charge storage and transfer circuit 11 of the pixel cell in the Mth row and the (N+1)th column, an output of a fourth charge storage and transfer circuit 14 of the pixel cell in the Mth row and the (N+1)th column, an output of the third charge storage and transfer circuit 13 of the pixel cell in the Mth row and the Nth column, and an output of a second charge storage and transfer circuit 12 of the pixel cell in the Mth row and the (N+1)th column are commonly connected to an input of the charge readout circuit 20 of the pixel cell in the Mth row and the Nth column.

In one particular embodiment, the first charge readout circuit 21 of the pixel cell in the Mth row and the Nth column is located at a upper right of the photoelectric conversion element 10 of the pixel cell in the Mth row and the Nth column, the second charge readout circuit 22 of the pixel cell in the Mth row and the Nth column is located at a lower right of the photoelectric conversion element 10 of the pixel cell in the Mth row and the Nth column.

In the pixel circuit of the time-of-flight sensor, the left and right pixel cells which are adjacent to each other share the same charge readout circuit 20, the number of transistors configured in the charge readout circuit 20 is reduced.

in the pixel cell in the Mth row and the Nth column, the first charge storage and transfer circuit and the second charge storage and transfer circuit are located at a top of the photoelectric conversion element 10, the third charge storage and transfer circuit and the fourth charge storage and transfer circuit are located at a bottom of the photoelectric conversion element 10; and two rows of pixel cells which are adjacent to each other are arranged to be reversed 180 degrees up-and-down with respect to each other. As an alternative, in the pixel cell in the Mth row and the Nth column, the first charge storage and transfer circuit and the second charge storage and transfer circuit are located at the bottom of the photoelectric conversion element 10, the third charge storage and transfer circuit and the fourth charge storage and transfer circuit are located at the top of the photoelectric conversion element 10; and two rows of pixel cells which are adjacent to each other are arranged to be reversed 180 degrees up-and-down with respect to each other.

In one particular embodiment, in the layout of the pixel cell in the Mth row and the Nth column in the pixel circuit of the time-of-flight sensor, the first charge storage and transfer circuit is located at a upper left of the top of the photoelectric conversion element 10, the second charge storage and transfer circuit is located at a lower right of the top of the photoelectric conversion element 10, the third charge storage and transfer circuit is located at a lower right of the bottom of the photoelectric conversion element 10, the fourth charge storage and transfer circuit is located at a lower left of the bottom of the photoelectric conversion element 10, the first switch transistor is located right above the photoelectric conversion element 10, the second switch transistor is located directly below the photoelectric conversion element 10.

A gate electrode of a first charge transfer transistor of the pixel cell in the Mth row and the Nth column is connected with a gate electrode of a first charge transfer transistor of a pixel cell in a (M+1)th row and a Nth column; a gate electrode of a first charge storage device of the pixel cell in the Mth row and the Nth column is connected with a gate electrode of a first charge storage device of the pixel cell in the (M+1)th row and the Nth column; a gate electrode of a first charge selection transistor of the pixel cell in the Mth row and the Nth column is connected with a gate electrode of a first charge selection transistor of the pixel cell in the (M+1)th row and the Nth column; a gate electrode of a second charge transfer transistor of the pixel cell in the Mth row and the Nth column is connected with a gate electrode of a second charge transfer transistor of the pixel cell in the (M+1)th row and the Nth column; a gate electrode of a second charge storage device of the pixel cell in the Mth row and the Nth column is connected with a gate electrode of a second charge storage device of the pixel cell in the (M+1)th row and the Nth column; a gate electrode of a second charge selection transistor of the pixel cell in the Mth row and the Nth column is connected with a gate electrode of a second charge selection transistor of the pixel cell in the (M+1)th row and the Nth column.

By connecting the gate electrodes of the various circuits of the first charge storage and transfer circuit and the gate electrodes of the various circuits of the second charge storage and transfer circuit of the pixel cell in the upper row with the gate electrodes of the various circuits of the first charge storage and transfer circuit and the gate electrodes of the various circuits of the second charge storage and transfer circuit of the pixel cell in the lower row, such that the control lines of the gate electrodes of these circuits can be shared, the number of metal traces are reduced. In one embodiment, physical structures of gate electrode material layers of two transistors which share the control line of gate electrode may be connected with each other, electrical extraction can be achieved through one contact hole. Meanwhile, the incident light of the photoelectric conversion element 10 is not seriously blocked, so that photosensitivity of pixels can be further improved.

A gate electrode of the third charge transfer transistor of the pixel cell in the Mth row and the Nth column is connected with a gate electrode of a third charge transfer transistor of a pixel cell in a (M−1)th row and a Nth column; a gate electrode of the third charge storage device of the pixel cell in the Mth row and the Nth column is connected with a gate electrode of a third charge storage device of the pixel cell in the (M−1)th row and the Nth column; a gate electrode of the third charge selection transistor of the pixel cell in the Mth row and the Nth column is connected with a gate electrode of a third charge selection transistor of the pixel cell in the (M−1)th row and the Nth column; a gate electrode of the fourth charge transfer transistor of the pixel cell in the Mth row and the Nth column is connected with a gate electrode of a fourth charge transfer transistor of the pixel cell in the (M−1)th row and the Nth column; a gate electrode of the fourth charge storage device of the pixel cell in the Mth row and the Nth column is connected with a gate electrode of a fourth charge storage device of the pixel cell in the (M−1)th row and the Nth column; a gate electrode of the fourth charge selection transistor of the pixel cell in the Mth row and the Nth column is connected with a gate electrode of a fourth charge selection transistor of the pixel cell in the (M−1)th row and the Nth column.

By connecting the gate electrodes of the various circuits of the third charge storage and transfer circuit and the gate electrodes of the various circuits of the fourth charge storage and transfer circuit of the pixel cell in the upper row with the gate electrodes of the various circuits of the third charge storage and transfer circuit and the gate electrodes of the various circuits of the fourth charge storage and transfer circuit of the pixel cell in the lower row, such that the control lines of the gate electrodes of these circuits can be shared, the number of metal traces are reduced. Meanwhile, the incident light of the photoelectric conversion element 10 is not seriously blocked, so that the photosensitivity of pixels can be further improved.

An output of the first charge readout circuit is connected to a first output column line, and an output of the second charge readout circuit is connected to a second output column line.

The first charge releasing transistor of the pixel cell in the Mth row and the Nth column is located at an intermediate position of a right side of the photoelectric conversion element 10, and the second charge releasing transistor of the pixel cell in the Mth row and the Nth column is located at an intermediate position of a left side of the photoelectric conversion element 10; a drain electrode of the first charge releasing transistor of the pixel cell in the Mth row and the Nth column is connected to a drain electrode of a second charge releasing transistor of a pixel cell in a Mth row and a (N−1)th column, and a drain electrode of the second charge releasing transistor of the pixel cell in the Mth row and the Nth column is connected to a drain electrode of a first charge releasing transistor of the pixel cell in the Mth row and the (N+1)th column.

The first charge releasing transistor and the second charging releasing transistor of the left or right pixel cells which are adjacent to each other share the same drain electrode, the size of the pixel circuit is reduced. Meanwhile, the incident light of the photoelectric conversion element 10 is not seriously blocked, so that the photosensitivity of pixels can be further improved.

The first switch transistor 102 and the second switch transistor 103 are symmetric about a central horizontal line of the pixel cell in the Mth row and the Nth column.

The first charge storage and transfer circuit and the fourth charge storage and transfer circuit are symmetrical about the central horizontal line of the pixel cell in the Mth row and the Nth column, and the second charge storage and transfer circuit and the third charge storage and transfer circuit are symmetrical about the central horizontal line of the pixel cell in the Mth row and the Nth column; and/or the first charge storage and transfer circuit and the second charge storage and transfer circuit are symmetrical about a central vertical line of the pixel cell in the Mth row and the Nth column, and the third charge storage and transfer circuit and the fourth charge storage and transfer circuit are symmetrical about the central vertical line of the pixel cell in the Mth row and the Nth column.

The first charge readout circuit 21 and the second charge readout circuit 22 are symmetric about the central horizontal line of the pixel cell in the Mth row and the Nth column, the first charge releasing transistor 122 and the second charge releasing transistor 123 are symmetric about the central vertical line of the pixel cell in the Mth row and the Nth column.

According to the pixel array in which each of the lay-flat and shared pixel cells has a compact and reasonable pixel layout, in the pixel array, the left pixel cells and the right pixel cells are symmetrical, the upper pixel cells and the lower pixel cells are symmetrical, the circuit configuration is neat, fixed noises caused due to the collections of photoelectric signals by the pixel circuit of the time-of-flight sensor can be effectively reduced, and the qualities of signals are further improved. The pixel circuit of the time-of-flight sensor in the present application can effectively improve the qualities of photosensitivity of pixels.

The method of reading photoelectric signals of the pixel circuit of the time-of-flight sensor is described in detail below with reference to FIG. 7.

As shown in FIG. 7, in each pixel unit, the first charge storage and transfer circuit 11, the second charge storage and transfer circuit 12, the third charge storage and transfer circuit 13, and the fourth charge storage and transfer circuit 14 respectively collect photoelectric signals corresponding to phase of 0 degree, phase of 90 degrees, phase of 180 degrees and phase of 270 degree of the modulated light wave, these photoelectric signals are respectively labeled as Q1, Q2, Q3, and Q4; that is, the first charge storage and transfer circuit 11, the second charge storage and transfer circuit 12, the third charge storage and transfer circuit 13, and the fourth charge storage and transfer circuit 14 respectively collect a first integrated charge signal Q1, a second integrated charge signal Q2, a third integrated charge signal Q3, and a fourth integrated charge signal Q4.

The first integrated charge signal Q1 and the second integrated charge signal Q2 are respectively converted into an optical electrical signal by the first charge readout circuit 21 to be output, labeled as a first photoelectric signal P1 and a second photoelectric signal P2, and the third integrated charge signal Q3 and the fourth integrated charge signal Q4 are respectively converted into an optical electrical signal for output by the first charge readout circuit 21, labeled as a third photoelectric signal P3 and a fourth photoelectric signal P4.

As shown in FIG. 7, each pixel in the pixel array collects phase integral charge signals (Q1, Q2, Q3 and Q4) of the modulated light wave in a synchronous global manner, and the phase photoelectric signals (P1, P2, P3 and P4) in the pixel are read row by row in a rolling readout manner, and the four phase photoelectric signals (P1, P2, P3, and P4) are respectively output by column signal output lines PO1 and PO2.

In the schematic diagram of the embodiment shown in FIG. 7, signals P1 and P2 of pixels in (M−1)th row, signals P3 and P4 of pixels in the Mth row, and signals P1 and P2 of pixels in the (M+1)th row are output through the column line PO1.

Signal P3 and signal P4 of the pixel in (M−1)th row, signal P3 and signal P4 of the pixel in the Mth row, and signal P3 and signal P4 of a pixel in the (M+1)th row are output through the column line PO2.

The column lines PO1 and PO2 sequentially output the signals P1, P2, P3 and P4 in the pixel array in an interleaved manner to a next stage circuit to be further processed.

In one embodiment, when the pixel circuit includes the first charge readout circuit and the second charge readout circuit, and an output of the first charge readout circuit is connected to the column signal output line PO1, an output of the second charge readout circuit is connected to the column signal output line PO2, the method of reading photoelectric signals in this embodiment is described as follows:

FIG. 8 is a schematic diagram of timing control of the pixel array of the time-of-flight sensor according to the present application. Timing sequences of the signals P3 and P4 of the pixels in the (M−1)th row, the signals P1, P2, P3 and P4 of the pixels in the Mth row, and the signals P1 and P2 of the pixels in the (M+1)th row are shown in FIG. 8, photoelectric signals of pixels in other rows are read out sequentially in scrolled manner by using the timing sequence shown in FIG. 8. In FIG. 8, the light source adopts a sine line continuous light wave, a low potential in each timing sequence indicates that a gate electrode of each of the various transistors is set at a low potential and these transistors are in switched-off states, a high potential in the timing sequence indicates that the gate electrode of each of the various transistors is set as a high potential and these transistor are in switched-on states; where high level pulses of the timing sequences of column signal output lines PO1 and PO2 represent pixel's output signal operation, (M−1) represent an operation on the pixels in the (M−1)th row, M represents an operation on the pixels in the Mth row, (M+1) represents an operation on the pixels in the (M+1)th row, P1, P2, P3 and P4 represent operations on signals P1, P2, P3, P4 of pixels, respectively, R represents an operation on a reset signal, and S represents an operation on an initial photoelectric signal.

The timing sequence shown in FIG. 8 includes three steps in acquisition operation of pixel array signals of the time-of-flight sensor, that is, a reset operation, a pixel exposure operation, and a signal reading operation.

The reset operation is used to remove the charges in the photoelectric conversion element 101 and remove the charges in the MOS transistor capacitors 108, 109, 110, 111; the rest operation includes: setting the gate electrodes of the transistors 102-107 and transistors 112-117 to high potential, after the charges in the transistors 101, 108, 109, 110, 111 are removed, the gate electrodes of the transistors 103, 105-107 and 112-115 are set to low potential, and the gate electrodes of the transistors 102 and 104 are kept at a high potential state. After the reset operation is completed, the light source is turned on, and pixels start to be exposed.

Regarding the pixel exposure operation, the light source continuously emits sinusoidal modulated light waves, the light source emits N2π sinusoidal modulated light waves in the pixel exposure period, where N is a natural number; the high potential of timing sequence of the first switch transistor 102 is the sum of the high potential of timing sequence of the first charge transfer transistor 104 and the high potential of timing sequence of the second charge transfer transistor 105, the high potential of timing sequence of the second switch transistor 103 is the sum of the high potential of timing sequence of the third charge transfer transistor 106 and the high potential of timing sequence of the fourth charge transfer transistor 107; and the first charge transfer transistor 104, the second charge transfer transistor 105, the third charge transfer transistor 106, and the fourth charge transfer transistor 107 modulate the collected photoelectric charge signals Q1, Q2, Q3 and Q4, respectively.

Regarding signal reading operation, the column signal output line PO1 outputs signals P1, P2 of pixels in the (M+1) row, and output signals P3 and P4 of pixels in the Mth row; the column signal output line PO2 outputs signals P1, P2 of pixels in Mth row and signals P3, P4 in (M−1)th row.

The signal reading operation specifically includes: the timing sequences of the first charge releasing transistor 122 and the second charge releasing transistor 123 are set to a high potential, the timing sequence of the first pixel selection transistor 120 is set to a high potential, a high potential pulse operation is performed on the first reset transistor 116, floating diffusion active regions of the pixels are reset, and the column signal output lines PO1 and PO2 subsequently output a reset signal of the pixel (M+1)_P1_R in the (M+1) row and a reset signal of the pixel M_P1_R in the Mth row, respectively;

In the next step, timing sequence high potential pulse operation is performed on the first charge selection transistor 112 and timing sequence low potential pulse operation is performed on the first charge storage device 108, the photoelectric charge Q1 in the first charge storage device 108 is transferred to the floating diffusion active region, and the column signal output lines PO1 and PO2 subsequently output the initial photoelectric signal of the pixel (M+1)_P1_S in the (M+1) row and the initial photoelectric signal of the pixel M_P1_S in the Mth row, respectively;

The signals P2, P3, P4 are obtained by configuring the timing sequences of the corresponding transistors.

Where, by performing the signal reading operation, the first photoelectric signals (i.e., the initial photoelectric signal of the pixels (M+1)_P1_S in the (M+1)th row and the initial photoelectric signal of the pixels M_P1_S in the Mth row) of pixel cells in adjacent rows are output simultaneously based on the column signal output line PO1 and the column signal output line PO2. In similar way, by performing the signal reading operation, the second photoelectric signals of the pixels in adjacent rows can be output simultaneously based on the column signal output line PO1 and the column signal output line PO2; the third photoelectric signals of the pixels in adjacent rows can be output simultaneously based on the column signal output line PO1 and the column signal output line PO2; the fourth photoelectric signals of the pixels in adjacent rows can be output simultaneously based on the column signal output line PO1 and the column signal output line PO2.

Further, a calculation expression of phase photoelectric signal of the pixel in the Mth row is expressed as follows:

$$P1 = M\_P1\_R - M\_P1\_S \tag{a1}$$

$$P2 = M\_P2\_R - M\_P2\_S \tag{a2}$$

$$P3 = M\_P3\_R - M\_P3\_S \tag{a3}$$

$$P4 = M\_P4\_R - M\_P4\_S \tag{a4}$$

An expression of phase photoelectric signal of the pixel in the (M−1)th row is listed as follows:

$$P3 = (M-1)\_P3\_R - (M-1)\_P3\_S \tag{b3}$$

$$P4 = (M-1)\_P4\_R - (M-1)\_P4\_S \tag{b4}$$

An expression of phase photoelectric signal of the pixel in the (M+1)th row is listed as follows:

$$P1 = (M+1)\_P1\_R - (M+1)\_P1\_S \tag{c1}$$

$$P2 = (M+1)\_P2\_R - (M+1)\_P2\_S \tag{c2}$$

According to the photoelectric signals acquired by the pixel array of the time-of-flight sensor of the present application, the detected phase-difference of light is expressed as follows:

$$\varphi = \mathrm{ArcTan}\left(\frac{P1 - P3}{P2 - P4}\right) \tag{1}$$

Thus, the time-of-flight of light is expressed as follows:

$$t = \frac{\varphi \cdot T}{2\pi} \tag{2}$$

A time-of-flight sensor is further provided in one embodiment of the present application, where the time-of-flight sensor includes the above-mentioned pixel circuit of time-of-flight sensor.

In this embodiment of the present application, the pixel circuit of the time-of-flight sensor includes pixel cells having A rows and B columns, in the pixel cell in an Mth row and an Nth column, the photoelectric conversion element 10 is used to receive a modulated light wave to generate a charge, where the modulated light wave is transmitted by a transmission circuit of a light source and is reflected by a target object to the photoelectric conversion element 10; the first charge storage and transfer circuit 11 is configured to selectively modulate a charge corresponding to a first phase of the modulated light wave to generate a first integrated charge signal according to a first charge modulation signal, and output the first integrated charge signal according to a first control signal; the second charge storage and transfer circuit 12 is configured to selectively modulate a charge corresponding to a second phase of the modulated light wave to generate a second integrated charge signal according to a second charge modulation signal, and output the second integrated charge signal according to a second control signal; the third charge storage and transfer circuit 13 is configured to selectively modulate a charge corresponding to a third phase of the modulated light wave to generate a third integrated charge signal according to a third charge modulation signal, and output the third integrated charge signal according to a third control signal; the fourth charge storage and transfer circuit 14 is configured to selectively modulate a charge corresponding to a fourth phase of the modulated light wave to generate a fourth integrated charge signal according to a fourth charge modulation signal, and output the fourth integrated charge signal according to a fourth control signal; the charge readout circuit 20 is configured to: output a third photoelectric signal to obtain a third calculation signal according to the third integrated charge signal, and output a second photoelectric signal to obtain a second calculation signal according to the second integrated charge signal; where the charge readout circuit 20 of the pixel cell in the Mth row and the Nth column is further configured to: output a first photoelectric signal of the pixel cell in the Mth row and the (N+1)th column to obtain a first calculation signal of the pixel cell in the Mth row and the (N+1)th column according to a first integrated charge signal output by the pixel cell in the Mth row and the (N+1)th column, and output a fourth photoelectric signal of the pixel cell in the Mth row and the (N+1)th column to obtain a fourth calculation signal of the pixel cell in the Mth row and the (N+1)th column according to a fourth integrated charge signal output by the pixel cell in the Mth row and the (N+1)th column; where a time of flight of light is obtained based on the first calculation signal, a second calculation signal, a third calculation signal and the fourth calculation signal corresponding to the pixel cells; both A and B are natural numbers, M is a natural number less than or equal to A, and N is a natural number less than B. Therefore, the left and right pixel cells which are adjacent to each other share the charge readout circuit, so that the size of the pixel circuit can be effectively reduced, the photosensitive area of the pixel photoelectric conversion element 10 can be further improved, and the photosensitivity of pixels can be improved accordingly. According to the pixel array of time-of-flight sensor having shared pixel electrode layout provided by the present application, a method of acquiring four-phase photoelectric signals P1, P2, P3 and P4 are adopted, the left and right columns of pixels which are adjacent to each other share a first group of photoelectric signal readout circuits and the second group of photoelectric signal readout circuits, so that the size of the pixel circuit can be effectively reduced, the photosensitive area of the pixel photoelectric conversion element is improved, and the pixel photosensitivity is improved accordingly; the upper row and lower row of pixels which are adjacent to each other in the pixel array share metal traces of gate electrodes of transistors, the left column and right column of pixels which are adjacent to each other share the drain electrodes of the charge releasing transistors, incident light of the photodiode is not seriously blocked, and the photosensitivity of pixels can be further improved. According to the pixel array in which each of the lay-flat and shared pixel cells has a compact and reasonable pixel layout, in the pixel array, the left pixel cells and the right pixel cells are symmetrical, the upper pixel cells and the lower pixel cells are symmetrical, the circuit configuration is neat, fixed noises caused due to the collections of photoelectric signals by the pixel circuit of the time-of-flight sensor can be effectively reduced, and the qualities of signals are further improved. The pixel circuit of the time-of-flight sensor in the present application can effectively improve the qualities of photosensitivity of pixels.

It should be understood that, the values of serial numbers of the steps in the aforesaid embodiments do not mean a sequencing of execution sequences of the steps, the execution sequences of the steps should be determined by functionalities and internal logic of the steps, and shouldn't be regarded as limitation to an implementation process of the embodiment of the present application.

The embodiments described above are only intended to explain but not to limit the technical solutions of the present application. Although the present application has been explained in detail with reference to these embodiments, a person of ordinary skilled in the art that may be aware of the fact that, the technical solutions disclosed in the embodiments can also be amended, some technical features in the technical solutions can also be equivalently replaced; the amendments or the equivalent replacements don't cause the essence of the corresponding technical solutions to be deviated from the spirit and the scope of the technical solutions in the embodiments of the present application, and thus should all be included in the protection scope of the present application.

What is claimed is:

1. A pixel circuit of a time-of-flight sensor, comprising pixel cells having A rows and B columns, wherein a pixel cell in an Mth row and an Nth column comprises:
   a photoelectric conversion element configured to receive a modulated light wave to generate a charge; wherein the modulated light wave is transmitted by a transmission circuit of a light source and is reflected by a target object to the photoelectric conversion element;
   a first charge storage and transfer circuit connected with the photoelectric conversion element and configured to selectively modulate a charge corresponding to a first phase of the modulated light wave to generate a first integrated charge signal according to a first charge modulation signal, and output the first integrated charge signal according to a first control signal;
   a second charge storage and transfer circuit connected with the photoelectric conversion element and configured to selectively modulate a charge corresponding to a second phase of the modulated light wave to generate a second integrated charge signal according to a second charge modulation signal, and output the second integrated charge signal according to a second control signal;
   a third charge storage and transfer circuit connected with the photoelectric conversion element and configured to selectively modulate a charge corresponding to a third phase of the modulated light wave to generate a third integrated charge signal according to a third charge modulation signal, and output the third integrated charge signal according to a third control signal;
   a fourth charge storage and transfer circuit connected with the photoelectric conversion element and configured to selectively modulate a charge corresponding to a fourth phase of the modulated light wave to generate a fourth integrated charge signal according to a fourth charge modulation signal, and output the fourth integrated charge signal according to a fourth control signal;
   a charge readout circuit commonly connected with an output of the third charge storage and transfer circuit and an output of the second charge storage and transfer circuit, and configured to output a third photoelectric signal to obtain a third calculation signal according to the third integrated charge signal, and output a second photoelectric signal to obtain a second calculation signal according to the second integrated charge signal;
   wherein the charge readout circuit of the pixel cell in the Mth row and the Nth column is further commonly connected with an output of a first charge storage and transfer circuit of a pixel cell in an Mth row and a (N+1)th column and an output of a fourth charge storage and transfer circuit of a pixel cell in an Mth row and a (N+1)th column, and the charge readout circuit of the pixel cell in the Mth row and the Nth column is configured to output a first photoelectric signal of the pixel cell in the Mth row and the (N+1)th column to obtain a first calculation signal of the pixel cell in the Mth row and the (N+1)th column according to a first integrated charge signal output by the pixel cell in the Mth row and the (N+1)th column, and the charge readout circuit of the pixel cell in the Mth row and the Nth column is configured to output a fourth photoelectric signal of the pixel cell in the Mth row and the (N+1)th column to obtain a fourth calculation signal of the pixel cell in the Mth row and the (N+1)th column according to a fourth integrated charge signal output by the pixel cell in the Mth row and the (N+1)th column;
   wherein a time of flight of light is obtained based on the first calculation signal, the second calculation signal, the third calculation signal and the fourth calculation signal corresponding to each of the pixel cells; both A and B are natural numbers, M is a natural number less than or equal to A, and N is a natural number less than B.

2. The pixel circuit according to claim 1, wherein the pixel cell in the Mth row and the Nth column comprises a first switch circuit and a second switch circuit, an input of the first charge storage and transfer circuit and an input of the second charge storage and transfer circuit are commonly connected with one end of the photoelectric conversion element through the first switch circuit, and an input of the third charge storage and transfer circuit and an input of the fourth charge storage and transfer circuit are commonly connected with the other end of the photoelectric conversion element through the second switch circuit.

3. The pixel circuit according to claim 1, wherein the first phase, the second phase, the third phase, and the fourth phase are one among a group consisting of 0 degrees, 90 degrees, 180 degrees, and 270 degrees; a period of modulated light source is composed of four period intervals which correspond to the first phase, the second phase, the third phase and the fourth phase in a one-to-one correspondence manner.

4. The pixel circuit according to claim 1, wherein the first charge storage and transfer circuit comprises a first charge transfer transistor, a first charge storage device, and a first charge selection transistor;
   a source electrode of the first charge transfer transistor is connected to a charge input of the first charge storage and transfer circuit, a drain electrode of the first charge transfer transistor is connected with a source electrode of the first charge storage device, a drain electrode of the first charge storage device is connected to a source electrode of the first charge selection transistor, and a drain electrode of the first charge selection transistor is connected with a first integrated charge signal output of the first charge storage and a transfer circuit;
   a gate electrode of the first charge transfer transistor is connected to a control line of the first charge modulation signal, and a gate electrode of the first charge selection transistor is connected to a control line of the first control signal;
   a first voltage is received at a gate electrode of the first charge storage device;
   and
   the second charge storage and transfer circuit comprises a second charge transfer transistor, a second charge storage device, and a second charge selection transistor;
   wherein a source electrode of the second charge transfer transistor is connected to a charge input of the second charge storage and transfer circuit, a drain electrode of the second charge transfer transistor is connected with a source electrode of the second charge storage device, a drain electrode of the second charge storage device is connected with a source electrode of the second charge selection transistor, and a drain electrode of the second charge selection transistor is connected with a second integrated charge signal output of the second charge storage and transfer circuit;
   a gate electrode of the second charge transfer transistor is connected to a control line of the second charge modulation signal, and a gate electrode of the second charge selection transistor is connected to a control line of the second control signal;
   a second voltage is received at a gate electrode of the second charge storage device;
   and
   the third charge storage and transfer circuit includes a third charge transfer transistor, a third charge storage device, and a third charge selection transistor;
   wherein a source electrode of the third charge transfer transistor is connected to a charge input of the third charge storage and transfer circuit, a drain electrode of the third charge transfer transistor is connected to a source electrode of the third charge storage device, a drain electrode of the third charge storage device is connected to a source electrode of the third charge selection transistor, and a drain electrode of the third charge selection transistor is connected to a third integrated charge signal output of the third charge storage and transfer circuit;
   a gate electrode of the third charge transfer transistor is connected to a control line of the third charge modulation signal, and a gate electrode of the third charge selection transistor is connected to a control line of the third control signal;
   a third voltage is received at a gate electrode of the third charge storage device;
   and
   the fourth charge storage and transfer circuit comprises a fourth charge transfer transistor, a fourth charge storage device, and a fourth charge selection transistor;
   wherein a source electrode of the fourth charge transfer transistor is connected to a charge input of the fourth charge storage and transfer circuit, a drain electrode of the fourth charge transfer transistor is connected with a source electrode of the fourth charge storage device, a drain electrode of the fourth charge storage device is connected with a source electrode of the fourth charge selection transistor, and a drain electrode of the fourth charge selection transistor is connected to a fourth integrated charge signal output of the fourth charge storage and transfer circuit;
   a gate electrode of the fourth charge transfer transistor is connected to a control line of the fourth charge modulation signal, and a gate electrode of the fourth charge selection transistor is connected to a control line of the fourth control signal;
   a fourth voltage is received at a gate electrode of the fourth charge storage device.

5. The pixel circuit according to claim 1, wherein the charge readout circuit of the pixel cell in the Mth row and the Nth column comprises a first charge readout circuit and a second charge readout circuit;
   the first charge readout circuit is commonly connected with an output of the second charge storage and transfer circuit of the pixel cell in the Mth row and the Nth column and an output of the first charge storage and transfer circuit of the pixel cell in the Mth row and the (N+1)th column, and is configured to output a second photoelectric signal of the pixel cell in the Mth row and the Nth column to obtain a second calculation signal of the pixel cell in the Mth row and the Nth column according to the second integrated charge signal of the pixel cell in the Mth row and the Nth column, and the first charge readout circuit is configured to output a first photoelectric signal of the pixel cell in the Mth row and the (N+1)th column to obtain a first calculation signal of the pixel cell in the Mth row and the (N+1)th column according to a first integrated charge signal of the pixel cell in the Mth row and the (N+1)th column;
   the second charge readout circuit is commonly connected with an output of the third charge storage and transfer circuit of the pixel cell in the Mth row and the Nth column and an output of the fourth charge storage and transfer circuit of the pixel cell in the Mth row and the (N+1)th column, and configured to output a third calculation signal of the pixel cell in the Mth row and the Nth column to obtain a third calculation signal of the pixel cell in the Mth row and the Nth column according to the third integrated charge signal of the pixel cell in the Mth row and the Nth column, and the second charge readout circuit is configured to output a fourth photoelectric signal of the pixel cell in the Mth row and the (N+1)th column to obtain a fourth calculation signal of the pixel cell in the Mth row and the (N+1)th column according to a fourth integrated charge signal of the pixel cell in the Mth row and the (N+1)th column.

6. The pixel circuit according to claim 5, wherein the first charge readout circuit comprises a first reset transistor, a first source follower transistor and a first pixel selection transistor;
wherein a drain electrode of the first reset transistor is connected with a first power supply, a drain electrode of the first source follower transistor is connected to a second power supply, the first power supply is identical to or different from the second power supply, a source electrode of the first reset transistor and a gate electrode of the first source follower transistor are commonly connected to an integrated charge signal input, a source electrode of the first source follower transistor is connected with a drain electrode of the first pixel selection transistor, and a source electrode of the first pixel selection transistor is connected to one photoelectric signal output;
a gate electrode of the first reset transistor is connected to a first reset control line to serve as a first reset control signal input and a second reset control signal input of the first charge readout circuit;
and
the second charge readout circuit comprises a second reset transistor, a second source follower transistor, and a second pixel selection transistor;
wherein a drain electrode of the second reset transistor is connected to the first power supply, a drain electrode of the second source follower transistor is connected to the second power supply, a source electrode of the second reset transistor and a gate electrode of the second source follower transistor are commonly connected to an integrated charge signal input, a source electrode of the second source follower transistor is connected with a drain electrode of the second pixel selection transistor, and a source electrode of the second pixel selection transistor is connected to another photoelectric signal output;
a gate electrode of the second reset transistor is connected to a second reset control line to serve as a third reset control signal input and a fourth reset control signal input of the second charge readout circuit.

7. The pixel circuit according to claim 1, wherein the pixel cell in the Mth row and the Nth column further comprises:
an anti-crosstalk circuit, connected with the photoelectric conversion element, the first charge storage and transfer circuit, the second charge storage and transfer circuit, the third charge storage and transfer circuit and the fourth charge storage and transfer circuit; and
the an anti-crosstalk circuit configured to remove charges in the photoelectric conversion element according to an anti-crosstalk control signal.

8. The pixel circuit according to claim 7, wherein the anti-crosstalk circuit comprises a first charge releasing transistor and a second charge releasing transistor;
a source electrode of the first charge releasing transistor and a source electrode of the second charge releasing transistor are commonly connected to an output of the photoelectric conversion element, a drain electrode of the first charge releasing transistor and a drain electrode of the second charge releasing transistor are commonly connected to a control power supply, and the anti-crosstalk control signal is received at a gate electrode of the first charge releasing transistor and a gate electrode of the second charge releasing transistor.

9. The pixel circuit according to claim 1, wherein the first calculation signal, the second calculation signal, the third calculation signal and the fourth calculation signal are obtained based on one frame pixel operation.

10. A circuit configuration of the pixel circuit of the time-of-flight sensor according to claim 1, wherein the photoelectric conversion element is located at an intermediate portion of the pixel cell in the Mth row and the Nth column, and the charge readout circuit is located at a right side of the photoelectric conversion element;
an output of the first charge storage and transfer circuit of the pixel cell in the Mth row and the (N+1)th column, an output of a fourth charge storage and transfer circuit of the pixel cell in the Mth row and the (N+1)th column, an output of the third charge storage and transfer circuit of the pixel cell in the Mth row and the Nth column and an output of a second charge storage and transfer circuit of the pixel cell in the Mth row and the (N+1)th column are commonly connected to an input of the charge readout circuit of the pixel cell in the Mth row and the Nth column.

11. The circuit configuration according to claim 10, wherein in the pixel cell in the Mth row and the Nth column, the first charge storage and transfer circuit and the second charge storage and transfer circuit are located at a top of the photoelectric conversion element, the third charge storage and transfer circuit and the fourth charge storage and transfer circuit are located at a bottom of the photoelectric conversion element; and two rows of pixel cells adjacent to each other are arranged to be reversed 180 degrees up-and-down with respect to each other.

12. The circuit configuration according to claim 10, wherein the first charge storage and transfer circuit and the fourth charge storage and transfer circuit are symmetrical about a central horizontal line of the pixel cell in the Mth row and the Nth column, and the second charge storage and transfer circuit and the third charge storage and transfer circuit are symmetrical about the central horizontal line of the pixel cell in the Mth row and the Nth column; and/or the first charge storage and transfer circuit and the second charge storage and transfer circuit are symmetrical about a central vertical line of the pixel cell in the Mth row and the Nth column, and the third charge storage and transfer circuit and the fourth charge storage and transfer circuit are symmetrical about the central vertical line of the pixel cell in the Mth row and the Nth column.

13. The circuit configuration according to claim 10, wherein the pixel circuit of the time-of-flight sensor comprises the first switch circuit and the second switch circuit; the first switch circuit comprises a first switching transistor, and the second switch circuit comprises a second switching transistor, wherein the first switching transistor and the second switching transistor are symmetrical about the central horizontal line of the pixel cell in the Mth row and the Nth column in a circuit layout of the pixel circuit of the time-of-flight sensor.

14. The circuit configuration according to claim 10, wherein the pixel circuit comprises first charge transfer transistors, first charge storage devices, first charge selection transistors, second charge transfer transistors, second charge storage devices, and second charge selection transistors,
a gate electrode of a first charge transfer transistor of the pixel cell in the Mth row and the Nth column is connected with a gate electrode of a first charge transfer transistor of a pixel cell in a (M+1)th row and a Nth column; a gate electrode of a first charge storage device of the pixel cell in the Mth row and the Nth column is connected with a gate electrode of a first charge storage device of the pixel cell in the (M+1)th row and the Nth column; a gate electrode of a first charge selection transistor of the pixel cell in the Mth row and the Nth column is connected with a gate electrode of a first charge selection transistor of the pixel cell in the (M+1)th row and the Nth column;

a gate electrode of a second charge transfer transistor of the pixel cell in the Mth row and the Nth column is connected with a gate electrode of a second charge transfer transistor of the pixel cell in the (M+1)th row and the Nth column; a gate electrode of a second charge storage device of the pixel cell in the Mth row and the Nth column is connected with a gate electrode of a second charge storage device of the pixel cell in the (M+1)th row and the Nth column; a gate electrode of a second charge selection transistor of the pixel cell in the Mth row and the Nth column is connected with a gate electrode of a second charge selection transistor of the pixel cell in the (M+1)th row and the Nth column; and/or wherein the pixel circuit comprises third charge transfer transistors, third charge storage devices, third charge selection transistors, fourth charge transfer transistors, fourth charge storage devices, and fourth charge selection transistors, a gate electrode of the third charge transfer transistor of the pixel cell in the Mth row and the Nth column is connected with a gate electrode of a third charge transfer transistor of a pixel cell in a (M−1)th row and a Nth column; a gate electrode of the third charge storage device of the pixel cell in the Mth row and the Nth column is connected with a gate electrode of a third charge storage device of the pixel cell in the (M−1)th row and the Nth column; a gate electrode of the third charge selection transistor of the pixel cell in the Mth row and the Nth column is connected with a gate electrode of a third charge selection transistor of the pixel cell in the (M−1)th row and the Nth column;

a gate electrode of the fourth charge transfer transistor of the pixel cell in the Mth row and the Nth column is connected with a gate electrode of a fourth charge transfer transistor of the pixel cell in the (M−1)th row and the Nth column; a gate electrode of the fourth charge storage device of the pixel cell in the Mth row and the Nth column is connected with a gate electrode of a fourth charge storage device of the pixel cell in the (M−1)th row and the Nth column; a gate electrode of the fourth charge selection transistor of the pixel cell in the Mth row and the Nth column is connected with a gate electrode of a fourth charge selection transistor of the pixel cell in the (M−1)th row and the Nth column.

15. The circuit configuration according to claim 10, wherein an output of the first charge readout circuit is connected to a first output column line, and an output of the second charge readout circuit is connected to a second output column line; and/or wherein the first charge readout circuit and the second charge readout circuit are symmetric about a central horizontal line of the pixel cell in the Mth row and the Nth column.

16. The circuit configuration according to claim 10, wherein the first charge releasing transistor of the pixel cell in the Mth row and the Nth column is located at an intermediate position of a right side of the photoelectric conversion element, and the second charge releasing transistor of the pixel cell in the Mth row and the Nth column is located at an intermediate position of a left side of the photoelectric conversion element;

wherein a drain electrode of the first charge releasing transistor of the pixel cell in the Mth row and the Nth column is connected to a drain electrode of a second charge releasing transistor of a pixel cell in a Mth row and a (N−1)th column, and a drain electrode of the second charge releasing transistor of the pixel cell in the Mth row and the Nth column is connected to a drain electrode of a first charge releasing transistor of the pixel cell in the Mth row and the (N+1)th column.

17. The circuit configuration according to claim 10, wherein the first charge releasing transistor and the second charge releasing transistor of the pixel cell in the Mth row and the Nth column are symmetrical about the central vertical line of the pixel cell in the Mth row and the Nth column.

18. A method for controlling the pixel circuit of the time-of-flight sensor according to claim 1, comprising following steps:

obtaining the first integrated charge signal, the second integrated charge signal, the third integrated charge signal and the fourth integrated charge signal in a global exposure manner; and reading, row by row, first photoelectric signals, second photoelectric signals, third photoelectric signals, and fourth photoelectric signals corresponding to the first integrated charge signal, the second integrated charge signal, the third integrated charge signal, and the fourth integrated charge signal in a rolling readout manner.

19. The method for controlling the pixel circuit of the time-of-flight sensor according to claim 18, wherein when the pixel circuit comprises the first charge readout circuit and the second charge readout circuit, and an output of the first charge readout circuit is connected to the first output column line, an output of the second charge readout circuit is connected to the second output column line, a method of reading the photoelectric signals comprises:

simultaneously outputting the first photoelectric signals in adjacent rows based on the first output line and the second output line; and/or simultaneously outputting the second photoelectric signals in the adjacent rows based on the first output line and the second output line; and/or simultaneously outputting the third photoelectric signals in the adjacent rows based on the first output line and the second output line; and/or simultaneously outputting the fourth photoelectric signals in adjacent rows based on the first output line and the second output line.

* * * * *